April 30, 1968  G. A. JAMES  3,380,349
VACUUM MOTOR
Filed Aug. 31, 1966  2 Sheets-Sheet 1
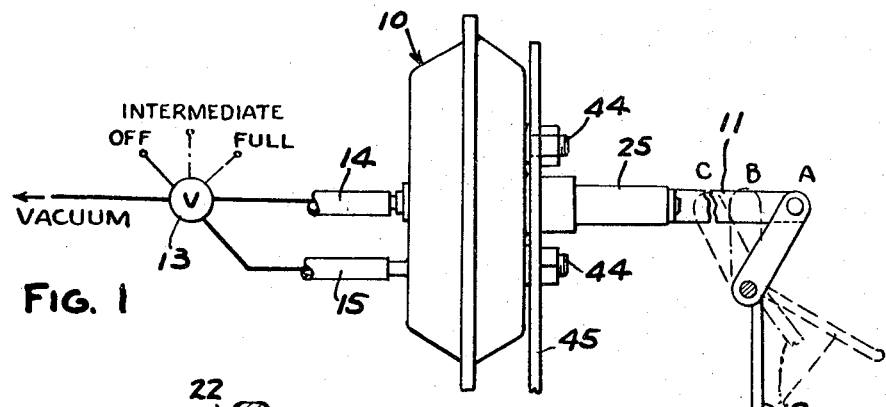
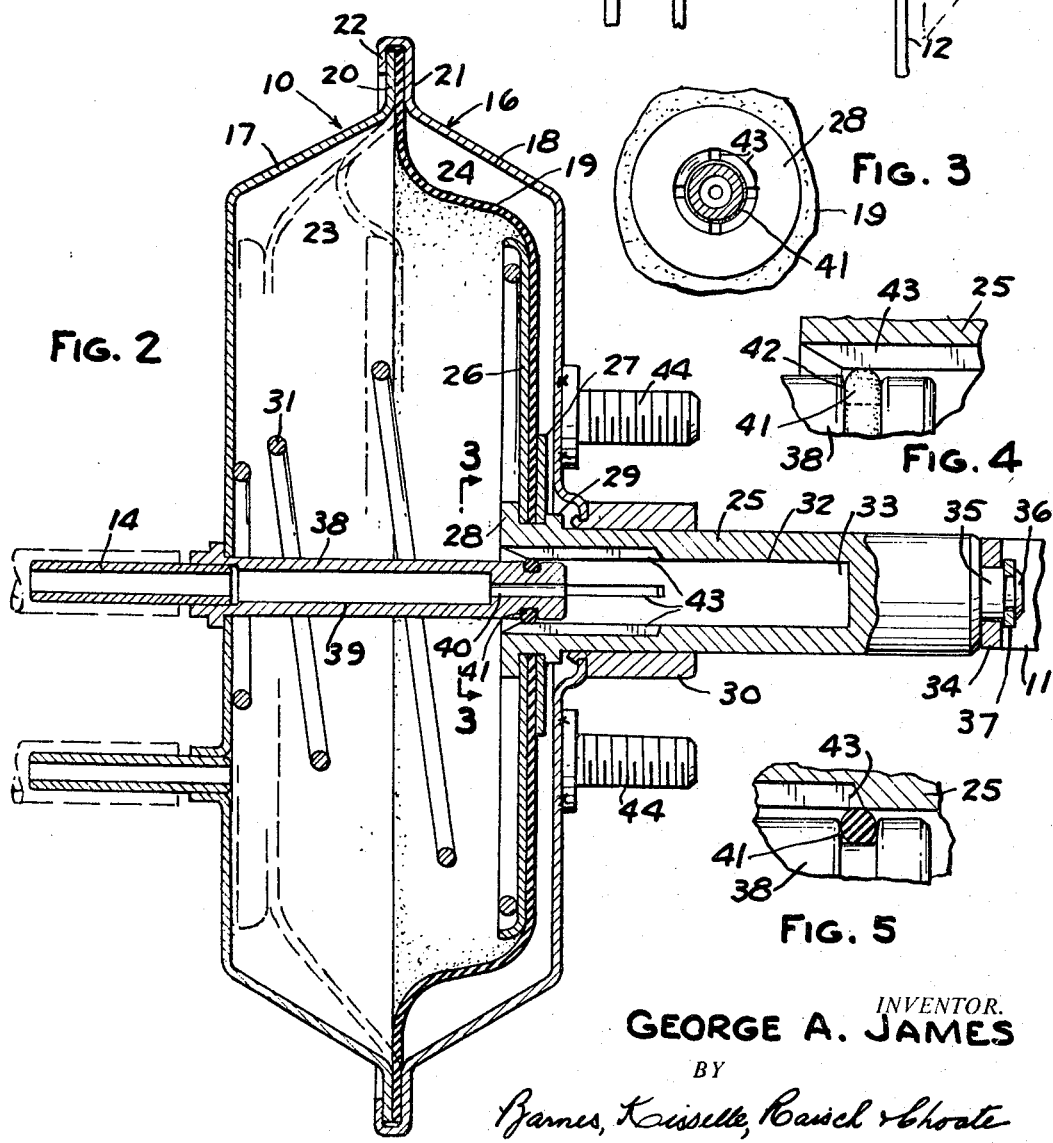
INVENTOR.
GEORGE A. JAMES
BY
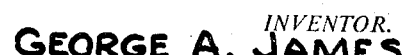
ATTORNEYS

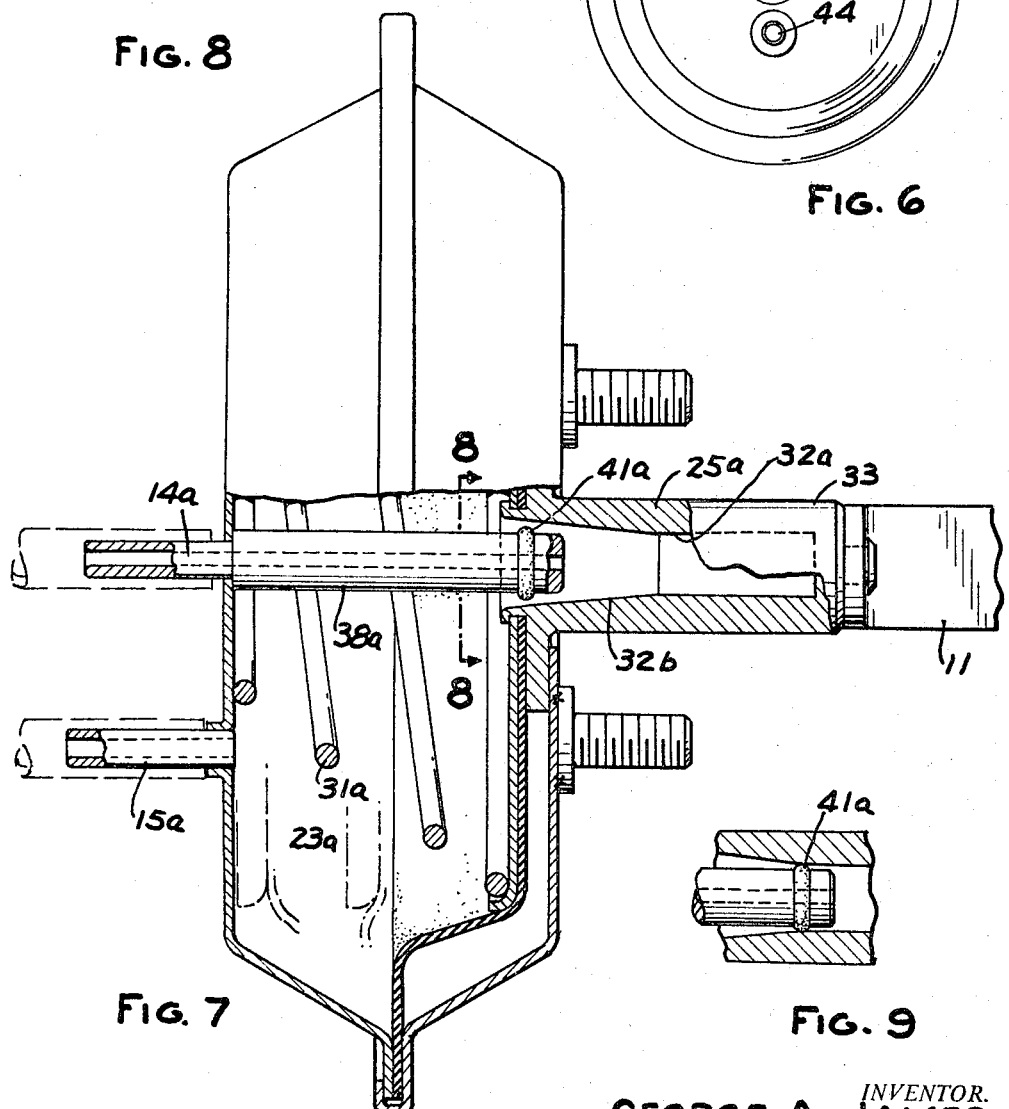

United States Patent Office 3,380,349
Patented Apr. 30, 1968

3,380,349
VACUUM MOTOR
George A. James, Dearborn, Mich., assignor to F & E Manufacturing Company, Wyandotte, Mich., a corporation of Michigan
Filed Aug. 31, 1966, Ser. No. 576,359
12 Claims. (Cl. 91—357)

This invention relates to vacuum motors and particularly to vacuum motors that are utilized for positioning elements such as doors or dampers in heating and air conditioning systems of automobiles.

It has heretofore been suggested that a vacuum motor incorporating a diaphragm can be utilized to position the door or damper of a heater or air conditioning system in automobiles.

It is an object of this invention to provide an improved vacuum motor which will positively position an element such as a heater door or damper in one of three positions with accuracy; which vacuum motor is relatively simple and economical to construct; which is relatively low in cost; and which operates efficiently with minimum maintenance.

In the drawings:

FIG. 1 is a partly diagrammatic view of the vacuum motor embodying the invention as utilized in a system.

FIG. 2 is a longitudinal sectional view through the vacuum motor embodying the invention.

FIG. 3 is a fragmentary sectional view taken along the line 3—3 in FIG. 2.

FIG. 4 is a fragmentary enlarged view of a portion of the vacuum motor shown in FIG. 2.

FIG. 5 is a view similar to FIG. 4 showing the parts in a different position.

FIG. 6 is a rear end view of the motor shown in FIGS. 1 and 2.

FIG. 7 is a part sectional view through a modified form of vacuum motor.

FIG. 8 is a fragmentary sectional view taken along line 8—8 in FIG. 7.

FIG. 9 is a fragmentary view of a portion of the vacuum motor shown in FIG. 7 with the parts in a different position.

Referring to FIG. 1, the vacuum motor 10 embodying the invention is adapted to control the movement of an actuator 11 which, in turn, controls the position of a heater door 12 or other element which is shown diagrammatically. The control for the vacuum motor 10 comprises a valve 13 that may be positioned in the case of an automobile adjacent the dashboard and has three positions designated "off," "intermediate" and "full." The valve 13 controls the application of vacuum to one of two lines 14, 15 of the vacuum motor 10. In the "off" position of the valve, the vacuum motor 10 positions the actuator 11 at the position designated A. In the "intermediate" position, vacuum is applied to the passage 14 and the vacuum motor 10 moves the actuator 11 to position B, while in the "full" position, vacuum is applied to the passage 15 and the vacuum motor 10 moves actuator 11 to position C.

Referring to FIGS. 2–6, the vacuum motor 10 comprises a housing 16 which consists of two substantially complementary halves 17, 18 of sheet metal or the like. A flexible diaphragm 19 of rubber or the like has its periphery clamped between the flanges 20, 21 of the halves 17, 18. The edge 22 of the flange 21 is crimped over the diaphragm 19 to thereby divide the interior of the housing 16 into two chambers 23, 24. The diaphragm 19 is formed at its center with an opening through which a tubular stem 25 extends. A large washer 26 and a small washer 27 are clamped on opposite sides of the diaphragm 19 and are fixed, in turn, on the tubular stem 25 between a shoulder 28 and an inwardly turned or deformed shoulder 29. The stem 25 extends in sliding relation through a bushing 30 that is fixed to the half 18 of the housing 16. A compression spring 31 in chamber 23 extends between the housing half 17 and the washer 26 and yieldingly urges the diaphragm and, in turn, the stem 25 toward the right or in a direction outwardly of the housing 16.

The opening 32 in the stem 25 is of substantially constant diameter throughout and terminates in a closed end 33. The end of the stem 25 is adapted to be connected to the actuator 11. Specifically, the end 34 of the actuator 11 is bent at a right angle and a projection 35 on the stem 25 extends through an opening therein and is deformed as at 36 over a washer 37 to lock the actuator 11 to the stem 25 (FIG. 2). As further shown in FIG. 2, a tube 38 is fixed to the housing half 17 substantially centrally thereof and has its end axially aligned with and projecting into the opening 32. The tube 38 has fixed thereto the inlet line 14 and has an opening 39 therein communicating with the line 14 and extending to a passage 40 of reduced cross section that communicates with the opening 32. An O-ring 41 is seated in an annular groove 42 (FIG. 4) on the end of the tube 38. O-ring 41 provides a sealing engagement with the opening 32. Opening 32 is provided with a plurality of longitudinally extending slots 43 which extend from the end of the stem 25 which communicates with chamber 23 along a portion of the length of the opening 32.

Threaded mounting studs 44 are provided on the housing half 18 to facilitate the mounting of the motor on a bracket 45 or the like (FIG. 1).

When no vacuum is applied to either of the lines 14, 15, that is when valve 13 is in the "off" position, the spring 31 urges the diaphragm 19 and, in turn, the stem 25 to a position where the actuator 11 holds the door 12 in position A (FIG. 1).

When the valve 13 is moved to the "intermediate" position, vacuum is supplied through line 14 and tube 38 to the opening 32. Since this provides vacuum to the interior of the chamber 23 through slots 43, continued application of vacuum causes the diaphragm 19 to move to the left as shown in FIG. 2 to the intermediate broken line position until the O-ring 41 reaches the portion of the opening 32 wherein the slots 43 terminate as shown in FIG. 5. The stem 25 will thereafter remain in this position holding the actuator 11 and, in turn, the door 12 in the B position.

When the valve 13 is thereafter moved to the "full" position, vacuum is transferred to the line 15 and is applied directly to chamber 23. This further reduces the pressure in chamber 23 causing the diaphragm to move against the pressure of the spring 31 further to the left and, in turn, bring the stem 25 to a position corresponding to position C in FIG. 1.

In the form of the invention shown in FIGS. 7–9, the corresponding parts have been designated with the letter "a." In this form of the invention, the opening 32a in the stem 33 is of substantially constant cross section in one portion and thereafter tapers outwardly at 32b into communication with the chamber 23a. When vacuum is supplied through line 14a through tube 38a, the pressure in the chamber 23A is reduced to draw the stem 25a to the left until the O-ring 41a engages the area of opening 32a which has substantially constant cross section.

Thereafter when vacuum is supplied to the line 15a so that vacuum is connected directly to chamber 23a, the pressure in the chamber 23a is further reduced to cause the stem 25a to move further to the left moving the actuator 11 to a position corresponding to a position C in FIG. 1.

It can thus be seen that there has been provided a vacuum motor which can be utilized to position a door or similar element of a heater or air conditioning system in one of three positions with accuracy; which is relatively simple and economical to construct; which can be manufactured at relatively low cost; and which operates efficiently with a minimum of maintenance.

I claim:
1. In a vacuum motor, the combination comprising
a housing,
a member within said housing dividing said housing into two chambers and movable therein to change the size of said two chambers,
a stem fixed to said member and projecting through one said chamber and an opening in said housing to the exterior,
said stem having a tubular closed end opening therein communicating with the other said chamber,
a tube fixed to said housing and extending through the other said chamber and into said opening in said stem,
a first inlet through said housing communicating with the interior of said tube,
a second inlet through said housing communicating directly with said other chamber,
interengaging means between said tube and said stem operable to provide a seal between said tube and said stem when said stem is moved inwardly of said housing,
whereby when vacuum is applied to said first inlet communicating with the interior of said tube, vacuum is applied to said other chamber and said stem is caused to be moved inwardly of said housing until said interengaging means produces a seal between said tube and said stem and thereafter when vacuum is supplied to said second inlet, vacuum is applied directly to said other chamber and said movable member is moved to cause said stem to move further within said housing.

2. The combination set forth in claim 1 wherein said interengaging means between said tube and said stem comprises an annular sealing member on the end of said tube and a plurality of circumferentially spaced longitudinally extending slots on the opening within said stem,
said slots extending for a distance less than the total depth of said opening in said tube.

3. The combination set forth in claim 2 wherein said sealing member comprises an O-ring.

4. The combination set forth in claim 1 wherein said interengaging means between said tube and said stem comprises an annular sealing member on the end of said tube, said opening in said stem having a first portion of substantially constant cross section and a second portion tapering gradually outwardly toward the other said chamber.

5. The combination set forth in claim 1 wherein said stem extends through a bushing fixed on said housing.

6. In a vacuum motor, the combination comprising
a housing,
a flexible diaphragm within said housing dividing said housing into two chambers and movable therein to change the size of said two chambers,
a stem having one end fixed to said diaphragm and projecting through on said chamber and an opening in said housing so that its other end is exterior of said housing,
said stem having a tubular closed end opening therein communicating with the other said chamber,
a tube fixed to said housing,
said tube being axially aligned with said stem and extending through the other said chamber into said opening in said stem,
a first inlet through said housing communicating with the interior of said tube,
a second inlet through said housing communicating directly with said one chamber,
interengaging means between said tube and said stem operable to provide a seal between said tube and said stem when said diaphragm and said stem are moved inwardly of said housing,
whereby when vacuum is applied to said first inlet communicating with the interior of said tube, vacuum is applied to said other chamber causing said diaphragm to move said stem inwardly of said housing until said interengaging means produces a seal between said tube and said stem and thereafter when vacuum is supplied to said second inlet, vacuum is applied directly to said other chamber and said movable member is moved to cause said stem to move further within said housing.

7. The combination set forth in claim 6 wherein said interengaging means between said tube and said stem comprises an annular sealing member on the end of said tube, said opening in said system having a substantially constant cross section and a plurality of circumferentially spaced longitudinally extending slots therein,
said slots extending for a distance less than the total depth of said opening in said tube.

8. The combination set forth in claim 7 wherein said sealing member comprises an O-ring.

9. The combination set forth in claim 7 wherein said interengaging means between said tube and said stem comprises an annular sealing member on the end of said tube, said opening in said stem having a first portion of substantially constant cross section and a second portion tapering gradually outwardly toward the other said chamber.

10. The combination set forth in claim 7 wherein said stem extends through a bushing fixed on said housing.

11. The combination set forth in claim 7 including washer members fixed to said stem on each side of said diaphragm.

12. The combination set forth in claim 7 wherein said housing comprises two halves and the periphery of said diaphragm is clamped between said two halves.

References Cited

UNITED STATES PATENTS

| | | | |
|---|---|---|---|
| 2,921,561 | 1/1960 | Sendoykas | 91—27 |
| 2,986,125 | 5/1961 | Young et al. | 91—357 |
| 3,072,108 | 1/1963 | Cripe | 91—357 |
| 3,125,001 | 3/1964 | Cripe | 91—357 |
| 3,334,545 | 8/1967 | Houser | 91—357 |

MARTIN P. SCHWADRON, *Primary Examiner.*

P. E. MASLOUSKY, *Assistant Examiner.*